Figure 1:
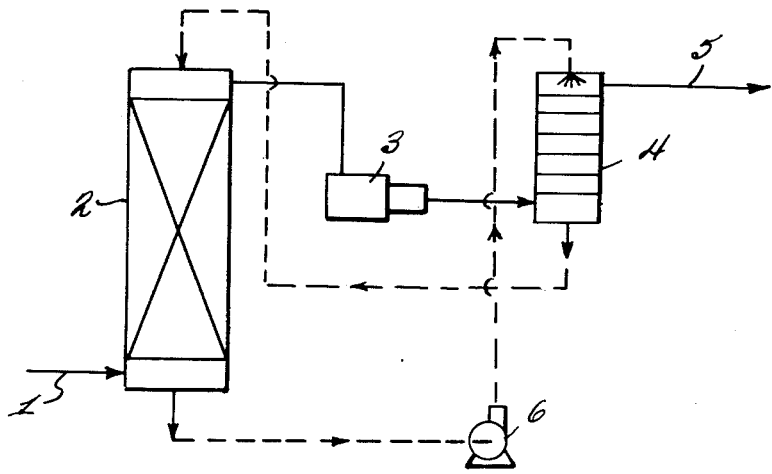

INVENTOR
MICHAEL J. DOLS

United States Patent Office 3,262,751
Patented July 26, 1966

3,262,751
REMOVAL OF NO FROM INDUSTRIAL GASES
Michael J. Dols, Beek, Netherlands, assignor to Stamicarbon N.V., Heerlen, Netherlands
Filed Nov. 15, 1963, Ser. No. 325,517
Claims priority, application Netherlands, Aug. 27, 1960, 255,320
5 Claims. (Cl. 23—2)

This is a continuation-in-part of application Serial No. 133,815, filed August 25, 1961, and now abandoned.

The present invention relates to the removal of nitric oxide from industrial gases such as cracking gases, producer gas and coke-oven gas.

It is known that in the low concentration in which it is contained in coke-oven gas, nitric oxide, after having been oxidized to nitrogen peroxide, slowly reacts with unsaturated hydrocarbons likewise contained in the gas, that is to say hydrocarbons containing one or more systems of conjugated double bonds, such as cyclopentadiene and butadiene 1–3, to form gums which cause serious fouling of the distribution grid and of the gas separation plants in which coke-oven gas is split up into condensable fractions and hydrogen by cooling. Owing to their explosive character, the gums constitute a constant danger to the gas separation plant.

Furthermore, it is known that the formation of these gums can be considerably accelerated and, in consequence of this, be localized, if the hydrocarbon concentration in the gas is increased by an extra addition of these hydrocarbons. In this case gum formation proceeds much faster and the gums formed can be removed before the gas is pumped into the distribution grid or to the gas separation plant, as described in British patent specification 483,706.

Although the concentration of the unsaturated hydrocarbons mentioned need only be increased to a small extent to obtain the desired rapid formation of gums, in the case of cyclopentadiene for instance, from 1.0 g./m.$^3$ S.T.P. to 2–5 g./m.$^3$ S.T.P., such an addition means a considerable consumption of the unsaturated hydrocarbons mentioned in view of the many m.$^3$ of gas produced in a coke-oven plant of the usual type.

The invention relates to a method for recovering the extra amount of cyclopentadiene added, and then using it again.

In the process according to the invention advantage is taken of the fact that industrial gas is generally compressed to a pressure of, for instance, 7–15 atmospheres with a view to the long distance supply or the separation of the gas.

If this compressed gas is subjected to an oil washing, a large portion of the cyclopentadiene present in the gas will be absorbed by the oil. This oil enriched with cyclopentadiene, may be desorbed again by bringing it into contact with the gas which has not yet been subjected to pressure. In this way, the cyclopentadiene required will circulate; only small quantities will have to be supplied to make up for losses, if any. The cyclopentadiene content need not be much higher than 1 g./m.$^3$ S.T.P.; a satisfactory removal of nitrogen oxide has been achieved with cyclopentadiene contents of only 1.5 and 1.8 g./m.$^3$ S.T.P.

It has also been found that, when HCN is present, it has a tendency to interfere with the gum-forming reaction. In accordance with one embodiment of the invention, when the industrial gas contains HCN, the molar ratio of hydrocarbon to HCN is at least 4 and the amount of conjugated unsaturated hydrocarbon is preferably at least 1.5 g./m.$^3$. This procedure is particularly useful when the gas contains up to 500 mg./m.$^3$ of HCN. If larger amounts are present, to assure drastic removal of NO, e.g., a removal to a content down to less than 0.02 cm.$^3$/m.$^3$ S.T.P., it is preferable to first lower the HCN content of the gas in a known way, e.g., by means of wet gas washing with a soda solution and/or by means of a dry gas purification with ferruginous earth. This pretreatment should lower the HCN content to less than 500 mg./m.$^3$ S.T.P. and preferably to less than 200 mg./m.$^3$ S.T.P. before subjecting the gas to the aforesaid treatment for removal of NO.

In the case of coke-oven gas the process according to the invention can advantageously be combined with the known extraction of benzene from coke-oven gas by means of an oil washing.

Figure 2:
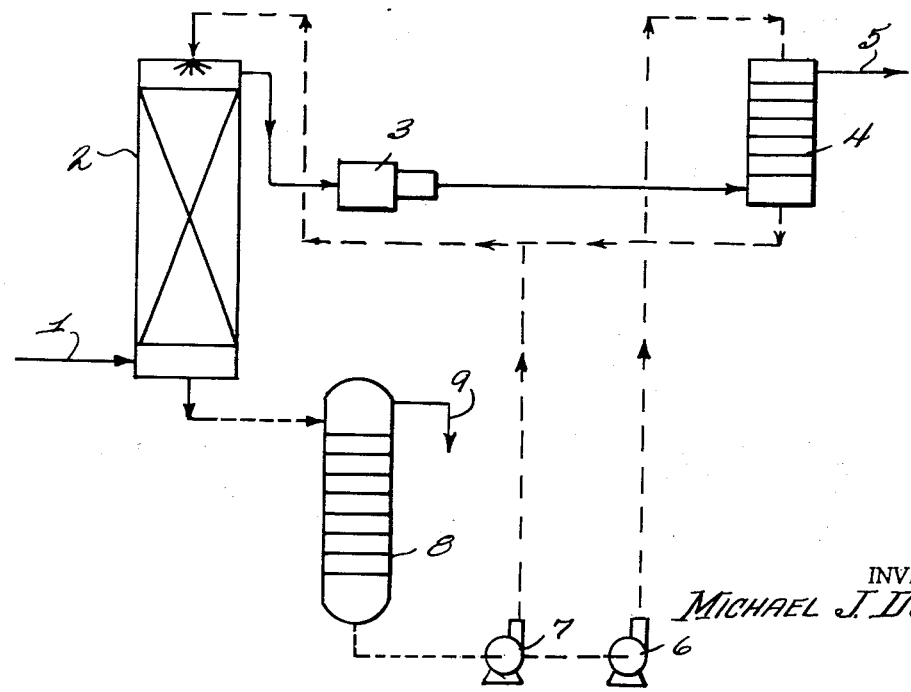

The FIGURES 1 and 2 are diagrams of the process according to the invention; wherein FIGURE 1 shows the process without extraction of benzene; and FIGURE 2 shows the process combined with the extraction of benzene.

According to FIGURE 1, the gas is introduced into washer 2 via conduit 1, in which washer the washing oil is largely freed of cyclopentadiene by the gas; the gas rich in cyclopentadiene is then compressed in compressor 3 and after that washed under pressure of e.g. 7–15 atm. in a washing column with oil poor in cyclopentadiene, which is supplied from washing column 2 via pump 6. In washing column 4, the oil again absorbs cyclopentadiene from the gas and also the gums present in the gas, which gums have resulted from the reaction between $NO_2$, formed from NO, and cyclopentadiene; after this the oil is introduced again into the top of washing column 2. The gas freed, or almost freed, of NO is discharged through conduit 5. The temperature in the washing columns 2 and 4 is kept preferably in the range of 25–35° C.

The process according to FIGURE 2 is almost the same as that of FIGURE 1, with the difference that the oil discharged from washing column 2, which is poor in cyclopentadiene, is now subjected to a benzene desorption in distillation column 8; the benzene vapours are discharged via conduit 9.

As the compressed gas can be washed with a smaller quantity of oil than the non-compressed gas, the oil resulting from the benzene desorption is separated into a portion fed to washing column 4 via pump 6, and a portion fed back direct to washing column 2 via pump 17.

The reaction between the NO and the cyclopentadiene present in the gas takes place where the reaction conditions are most favorable, i.e., where temperature, diolefine concentration, and oxygen concentration are all high. These conditions are satisfied in the compressor and immediately behind the exhaust of compressor 3 in FIGURE 1, where the pressure and temperature, e.g., 3–14 atm. and 30–140° C., respectively. From analyses, it has indeed appeared that the removal of NO takes place in the compressor and in the conduit between compressor 3 and washing column 4. The nitrogen peroxide and gum particles formed are removed together with the condensate formed in the compressor and in the conduit by cooling, which condensate is removed from the system via siphons not shown in the drawing.

The gum forming reaction is not restricted to NO and cyclopentadiene; instead of cyclopentadiene other unsaturated hydrocarbons with one or more systems of conjugated bonds, such as butadiene 1.3 and indene, may be used. However, in the present process, it is not generally practicable to use these other unsaturated hydrocarbons, because butadiene, for instance, is not washed out in the oil washing in column 4, while indene, for instance, owing to its lower volatility, condenses after or during the compression, so that its concentration in the gas will be too low for a rapid gum forming reaction to be achieved.

Consequently, the process according to the invention can only be carried out with cyclopentadiene or an unsaturated hydrocarbon with conjugated double bonds and having approximately the same physical properties with respect to washability with oil and volatility.

It should be noted that the published Dutch patent application 204,585 proposes a process for removing NO from gas mixtures by washing these mixtures with a solution of unsaturated hydrocarbons capable of forming gums with nitric oxide.

The process under discussion differs from this process in that in the process according to the invention the gum formation takes place in the gas phase before the washing process in washing column 4, as appears from the following figures measured during the removal of NO from coke-oven gas.

The figures mentioned are the average figures of 6–10 measurements.

| Cyclopentadiene Content in the Gas After Washer, 2 g./m.$^3$ S.T.P. | Nitrogen Oxides (NO+NO$_2$) in cm.$^3$/m.$^3$ S.T.P. | | | |
|---|---|---|---|---|
| | Inlet Compressor | Outlet Compressor | Inlet Washer | Outlet Washer |
| 1.1 | 0.89 | 0.69 | 0.55 | 0.28 |
| 3.5 | 0.44 | 0.08 | 0.06 | 0.05 |
| 4.3 | 0.49 | 0.11 | 0.06 | 0.04 |

If the gas is led to the gas separation plant after this purification, some nitrogen oxide will disappear during the transport through the conduit owing to the condensation of water taking place there, so that at the entrance to the gas separation plant the nitrogen oxide content has decreased to less than 0.02 cm.$^3$/m.$^3$ S.T.P. provided the original gas contained a sufficient amount of cyclopentadiene (S.T.P. refers to Standard Temperature and Pressure, 0° C. and atmospheric pressure).

In another typical example, the crude gas contained 0.2 g./m.$^3$ HCN and the cyclopentadiene content was adjusted, in the first washer, to 4.3 g./m.$^3$ S.T.P. As a result, the gas is satisfactorily cleansed of NO.

What is claimed is:

1. A process for removing nitric oxide from industrial gases in which nitrogen oxide in the industrial gas is reacted with a conjugated diolefin, said process comprising contacting said industrial gas with an oil containing said diolefin to desorb the diolefin from said oil until the diolefin content of said gas is at least 1.5 grams diolefin per cubic meter S.T.P., compressing the gas sufficiently to cause a reaction between the nitric oxide and the desorbed diolefin to form a gummy substance, contacting the compressed gas with said oil to absorb unreacted diolefin into the oil, and removing said gummy substance from said gas.

2. A process for removing nitric oxide from industrial gases which also contain hydrogen cyanide in which nitrogen oxide in said industrial gas is reacted with a conjugated diolefin, said process comprising contacting an industrial gas containing up to 0.5 g./m.$^3$ hydrogen cyanide with an oil containing said diolefin to desorb the diolefin from said oil until the diolefin content of said gas is at least 1.5 grams of diolefin per cubic meter S.T.P. and the ratio of diolefin to hydrogen cyanide in said gas is at least 4, compressing the gas sufficiently to cause a reaction between the nitric oxide and the desorbed diolefin to form a gummy substance, contacting the compressed gas with said oil to absorb unreacted diolefin into said oil and removing said gummy substance from said gas.

3. A process for removing nitric oxide as set forth in claim 1 in which said industrial gas is coke oven gas.

4. A process as set forth in claim 3 including subsequently subjecting the gas to a low-temperature gas separation.

5. A process for removing nitric oxide as set forth in claim 1 in which the diolefin is cyclopentadiene.

References Cited by the Examiner

UNITED STATES PATENTS

| 1,926,058 | 9/1933 | Odell | 23—3 |
| 3,031,258 | 4/1962 | Giammarco | 23—2 |

FOREIGN PATENTS

| 307,886 | 7/1930 | Great Britain. |
| 483,706 | 4/1938 | Great Britain. |

OSCAR R. VERTIZ, Primary Examiner.

MAURICE A. BRINDISI, EARL C. THOMAS,
Examiners.